Feb. 10, 1953 M. F. HARRIS 2,627,860
HAIRPIN SPREADING DEVICE
Filed Sept. 3, 1949
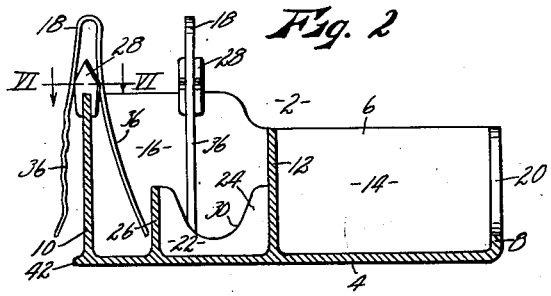
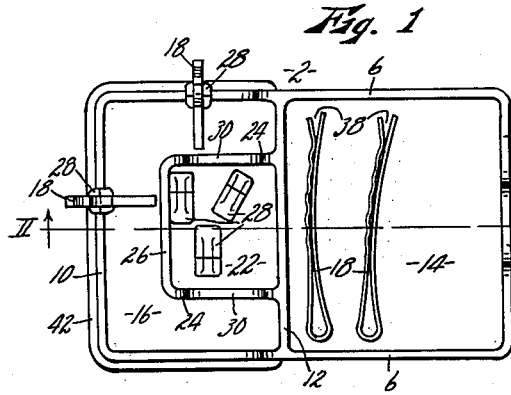
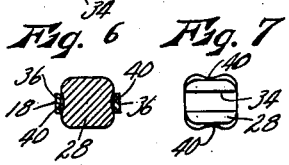
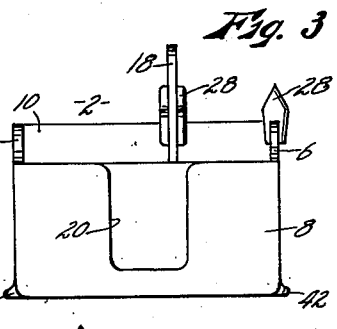
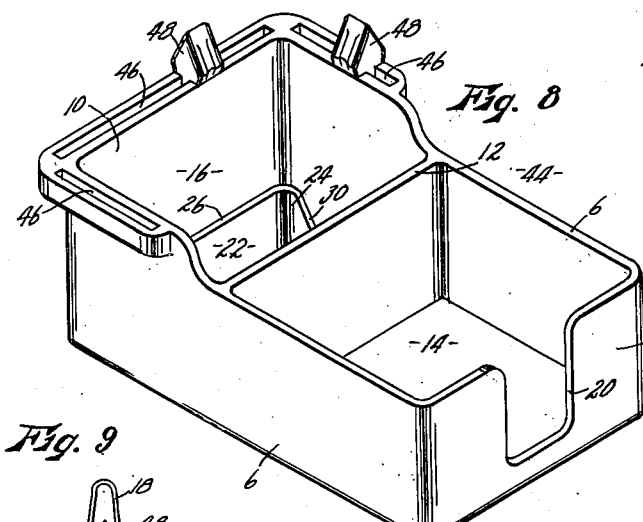
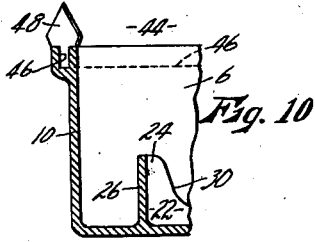
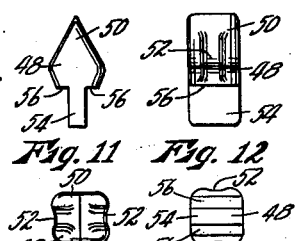
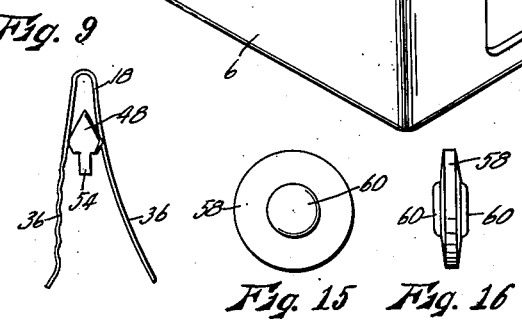
INVENTOR.
Mechell F. Harris.
BY Roy E. Hamilton,
Attorney.

Patented Feb. 10, 1953

2,627,860

UNITED STATES PATENT OFFICE 2,627,860

HAIRPIN SPREADING DEVICE

Mechell F. Harris, Kansas City, Mo.

Application September 3, 1949, Serial No. 113,930

5 Claims. (Cl. 132—1)

1

This invention relates to new and useful improvements in hairpin spreading devices, and has particular reference to a device suitable for spreading apart the legs of hairpins of the class commonly known as "bobby pins."

The principal object of the present invention is the provision of a spreader member adapted to be inserted between the resilient legs of a hairpin to separate and hold said legs apart while the hairpin is positioned in the hair, said spreader member being removable from said hairpin to permit the legs thereof to close and grip the hair therebetween. The legs of hairpins of the class commonly called "bobby pins" are usually separated and held apart by the fingers and fingernails of the user, and this results in fatigue and soreness of the fingers, and damage to fingernail polish of the user. This invention obviates these undesirable results.

Another object is the provision of a holder adapted to position the spreader members in a position convenient for the positioning of hairpins thereon.

A further object is the provision, in a hairpin spreading device of the character described, of a spreader member having a wedge-shaped portion adapted to be inserted between the legs of a hairpin, grooves being formed in the faces of said wedge-shaped portion to receive the legs of said hairpin, whereby accidental dislodgment of said spreader from said hairpin is prevented.

Other objects are simplicity and economy of construction, ease and convenience of operation, and the provision of storage space for both the hairpins and the spreader members.

With these objects in view, as well as other objects which will appear in the course of the specification, reference will be had to the drawing, wherein:

Figure 1 is a plan view of a hairpin spreading device of the character described, showing spreader members positioned operatively on the holder, and hairpins positioned on said spreader members.

Figure 2 is a sectional view taken on line II—II of Fig. 1, with parts omitted.

Figure 3 is a front elevation of the device.

Figure 4 is an enlarged end elevation of one of the spreader members.

Figure 5 is a side elevation of one of the spreader members.

Figure 6 is an enlarged section taken on line VI—VI of Fig. 2.

Figure 7 is a bottom view of the spreader member.

2

Figure 8 is a perspective view showing modified forms of the holder and spreader member.

Figure 9 is an end elevation of a spreader member suitable for use with the holder shown in Fig. 8, shown in operative relation to a hairpin.

Figure 10 is a fragmentary vertical section of the holder shown in Fig. 8, with a spreader member carried thereby.

Figure 11 is an enlarged end elevation of a spreader member suitable for use with the holder shown in Fig. 8.

Figure 12 is a side elevation of the spreader member shown in Fig. 11.

Figure 13 is a top view of the spreader member shown in Fig. 11.

Figure 14 is a bottom view of the spreader member shown in Fig. 11.

Figure 15 is a side elevation of a modified spreader member suitable for use with the holder shown in Fig. 8.

Figure 16 is an edge view of the spreader member shown in Fig. 15.

Like reference numerals apply to similar parts throughout the several views, and in Figures 1 to 7 the numeral 2 applies to a holder made of wood, plastic, metal, or other suitable material and comprising a substantially rectangular box open at the top and having a bottom 4, side walls 6, and end walls 8 and 10. Said box is divided by a transverse partition 12 to form two compartments 14 and 16. Compartment 14, adjacent end wall 8, serves as a storage space for hairpins 18, as shown in Fig. 1. End-wall 8 is provided with a finger notch 20 permitting easy removal of hairpins from said compartment. Within compartment 16, a smaller compartment 22 is formed by partition 12, side-walls 24 and end-wall 26, said side- and end-walls being respectively spaced apart from side-walls 6 and end-wall 10 of the holder for a purpose hereinafter described. Compartment 22 serves as a receptacle for spreaders 28 when they are not in use, and the side-walls 24 thereof are provided with finger notches 30 for permitting easy removal of the spreaders therefrom.

The preferred form of the spreader, detailed in Figs. 4 to 7, comprises an elongated member having one end portion 32 thereof formed in a wedge shape. Said spreader is also tapered slightly towards its opposite end, and a slot 34 is formed in the opposite end, said slot being parallel to the edge of the wedge portion 32. Said slot is proportioned to fit slidably over the upper edge portions of side-walls 6 and end-wall 10 of the holder, or more particularly the portions of those walls bounding compartment 16 of the holder, as shown in Figs. 1–3. Thus the spreaders are supported firmly but detachably, with the wedge-shaped portions thereof projecting upwardly.

The hairpins 18 are of the type commonly known as "bobby pins," and comprise a length of spring steel or other suitable material bent intermediate its ends to form two legs 36 which are normally urged together by their resilience to grip hair therebetween. One of the legs is usually crimped in serpentine shape to better grip the hair, and the extreme end portion of one of the legs is bent outwardly to provide a tapering entry 38 for inserting an object to spread the legs apart. When a spreader member 28 has been placed on the upper edge of walls 6 or 10 as described above, a bobby pin may be pushed downwardly over the spreader, the legs 36 thereof being separated by, and passing on opposite sides of the wedge-shaped portion of the spreader, as best shown in Fig. 2. It will be noted that shallow, rounded grooves 40 are formed longitudinally in the faces of wedge 32. These grooves receive the legs 36 of the hairpin, and prevent the spreader from being dislodged laterally from between the legs of the bobby pin by accident. One of the legs 36 of the bobby pin passes outside the holder 2, and the other leg extends downwardly through compartment 16 into the space between the holder walls and the walls of spreader compartment 22. The holder walls bounding compartment 16 are of sufficient height to permit the bobby pin to be pushed down until the spreader is positioned in the upper portion thereof. It will be noted that the end-wall 10 and the portions of side-walls 6 bounding compartment 16 are provided at the lower edge with an outwardly extending flange 42. This flange bears on the surface, not shown, which supports the holder, and prevents the holder from being tipped as the bobby pins are pushed over the spreaders.

After the bobby pin has been positioned on the spreader as described, the bobby pin and the spreader are lifted from the holder. It will be noted that the thickest portion of the spreader, or that portion clamped between the legs of the bobby pin, is disposed above the upper end of slot 34. This prevents the resilient force of the bobby pin from pinching the walls of said slot against the holder walls, which would interfere with the easy removal of the spreader from the holder. After the bobby pin has been positioned in the hair as desired, spreader 28 may be removed by exerting thereon a pressure lateral to the legs of the bobby pin. The rounded contour of the grooves 40 in the spreader permits the removal of the spreader in this manner. The spreader may then be replaced on the holder walls for repeated use, or in compartment 22 for storage.

In the modified form shown in Figs. 8 to 14, the holder 44 is substantially the same as holder 2 of the preferred form except that the upper edge portions of end-wall 10 and side-walls 6 bounding compartment 16 are thickened, and grooves 46 are formed longitudinally in the upper surfaces thereof. The spreader 48 for use with the holder shown in Fig. 8 is best shown in Figs. 11 to 14, and is substantially similar to spreader 28 of the preferred form, having a wedge-shaped upper portion 50 with shallow rounded grooves 52 formed in the faces thereof, except that the lower portion is reduced in thickness to form a tongue 54 adapted to be received slidably in grooves 46 of the holder. Shoulders 56 formed on the spreader adjacent tongue 54 bear on the upper edges of the holder walls, thereby providing a broader, firmer support for the spreader. The operation of the modified form is substantially the same as that of the form shown in Figs. 1 to 8.

Figs. 15 and 16 show a modified spreader 58 suitable for use with the holder shown in Fig. 8. This spreader comprises a flat disc having a central circular boss 60 on each side thereof, the edges of said bosses being rounded. The disc is uniformly tapered from said bosses to its outer edge, said outer edge being sufficiently thin to permit its insertion between the legs of a bobby pin. With the disc held in a vertical plane, the tapered edge portion thereof is inserted in groove 46 of the holder. Bosses 60 rest in rolling contact with the upper edges of the holder walls, and also provide sufficient thickness to spread the legs of the bobby pin properly. The bobby pins are pushed over the spreader with the legs thereof disposed approximately diametrically relative to the spreader. The operation is substantially similar to that of the previously described forms of the spreader.

While I have shown specific embodiments of my invention, it is apparent that many minor variations of construction and operation could be made without departing from the spirit of the invention.

What I claim is:

1. A hairpin spreading device comprising a wedge-shaped member adapted to be inserted between the legs of a hairpin to a position adjacent the bend of said hairpin to separate and hold said legs apart, said wedge-shaped member having grooves formed in the faces thereof for receiving and positioning and maintaining said legs in proper relation to said spreading device, said grooves having a rounded cross-sectional contour whereby said spreading device may be dislodged from said hairpin by exerting a pressure thereon transversely to said grooves.

2. A hairpin spreading device for use in combination with a hairpin comprising a length of resilient material rebent intermediate its ends to form legs resiliently urged together comprising a holder adapted to be supported on any solid surface, said holder including vertically disposed side walls, and a spreader member having an upwardly projecting wedge-shaped portion adapted to separate and hold apart the legs of said hairpin, said spreader having a groove formed in the lower portion thereof and fitting loosely over the upper edge portion of said walls, whereby said spreader member is releasably supported on said wall with the edge of the wedge-shaped portion thereof in the plane of said wall.

3. A hairpin spreading device for use in combination with a hairpin comprising a length of resilient material rebent intermediate its ends to form legs resiliently urged together comprising a holder adapted to be supported on any solid surface, said holder including a vertically disposed planar wall having a horizontal upper edge and means for supporting said wall, and a spreader member having a wedge-shaped upper portion and having its lower portion slotted and fitting slidably over the upper edge portion of said wall.

4. A hairpin spreading device for use in combination with a hairpin comprising a length of resilient material rebent intermediate its ends to form legs resiliently urged together comprising a holder adapted to be supported on any solid surface, said holder including a vertically disposed planar wall having a horizontal upper edge and means for supporting said wall, and a spreader member having a wedge-shaped upper portion and having its lower portion slotted and fitting slidably over the upper edge portion of said wall, the wedge-shaped portion of said spreader member projecting upwardly and having its edge disposed in the plane of said wall.

5. A hairpin spreading device for use in combination with a hairpin comprising a length of resilient material rebent intermediate its ends to form legs resiliently urged together comprising a holder adapted to be supported on any solid surface, said holder including a vertically disposed planar wall having a horizontal upper edge and means for supporting said wall, and a spreader member having a wedge-shaped upper portion and having its lower portion slotted and fitting slidably over the upper edge portion of said wall, the wedge-shaped portion of said spreader member having rounded grooves formed in the faces thereof at right angles to the edge of said wedge for receiving and positioning the legs of said hairpin.

MECHELL F. HARRIS.

REFERENCES CITED

The following references are of record in the file of this patent:

UNITED STATES PATENTS

| Number | Name | Date |
| --- | --- | --- |
| D. 153,810 | Koslap | May 17, 1949 |
| D. 160,079 | Feyrer | Sept. 12, 1950 |
| 2,484,313 | Rennecamp et al. | Oct. 11, 1949 |
| 2,551,884 | Jackson | May 8, 1951 |
| 2,553,246 | Formica | May 15, 1951 |